United States Patent
Chack (10) Patent No.: US 7,552,166 B2
(45) Date of Patent: Jun. 23, 2009

(54) METHOD OF QUEUING REQUESTS TO ACCESS A COMMUNICATIONS NETWORK

(76) Inventor: Michael A. Chack, 1030 Laura Ville La., San Jose, CA (US) 95125

( * ) Notice: Subject to any disclaimer, the term of this patent is extended or adjusted under 35 U.S.C. 154(b) by 823 days.

(21) Appl. No.: 10/660,881

(22) Filed: Sep. 11, 2003

(65) Prior Publication Data

US 2004/0073670 A1    Apr. 15, 2004

Related U.S. Application Data

(62) Division of application No. 09/325,508, filed on Jun. 3, 1999, now abandoned.

(60) Provisional application No. 60/121,214, filed on Feb. 22, 1999.

(51) Int. Cl.
*G06F 15/16* (2006.01)

(52) U.S. Cl. ............... 709/202; 709/219; 395/185; 395/187.01; 364/286.4; 364/222.5

(58) Field of Classification Search ........... 709/202, 709/219; 395/185, 187.01; 364/286.4, 222.5
See application file for complete search history.

(56) References Cited

U.S. PATENT DOCUMENTS

| | | | |
|---|---|---|---|
| 5,001,710 A | 3/1991 | Gawrys et al. | |
| 5,307,347 A * | 4/1994 | Duault et al. | 370/439 |
| 5,555,179 A | 9/1996 | Koyama et al. | |
| 5,742,757 A * | 4/1998 | Hamadani et al. | 726/32 |
| 5,764,916 A | 6/1998 | Busey et al. | |
| 5,765,033 A | 6/1998 | Miloslavsky | |
| 5,778,178 A | 7/1998 | Arunachalum | |
| 5,790,800 A | 8/1998 | Gauvin et al. | |
| 5,793,365 A | 8/1998 | Tang et al. | |
| 5,793,861 A | 8/1998 | Haigh | |
| 5,825,869 A | 10/1998 | Brooks et al. | |
| 5,856,978 A | 1/1999 | Anthias et al. | |
| 5,884,032 A | 3/1999 | Bateman et al. | |
| 5,923,735 A | 7/1999 | Swartz et al. | |
| 5,926,539 A | 7/1999 | Shtivelman | |
| 5,946,387 A | 8/1999 | Miloslavsky | |
| 5,951,706 A | 9/1999 | Benner | |
| 5,953,332 A | 9/1999 | Miloslavsky | |
| 5,953,405 A | 9/1999 | Miloslavsky | |
| 5,956,720 A | 9/1999 | Fernandez et al. | |
| 5,960,178 A | 9/1999 | Cochinwala et al. | |
| 5,970,498 A * | 10/1999 | Duffield et al. | 707/104.1 |
| 5,999,964 A | 12/1999 | Murakata et al. | |
| 6,002,760 A | 12/1999 | Gisby | |
| 6,021,428 A | 2/2000 | Miloslavsky | |
| 6,023,510 A | 2/2000 | Epstein | |
| 6,023,722 A | 2/2000 | Colyer | |

(Continued)

*Primary Examiner*—Tammy Nguyen (57) ABSTRACT

A method is provided for queuing requests for access to a software through a communication network having a limited amount of licenses to the software. In one embodiment, the invention includes a server having the software receiving requests for access to the software from a plurality of remote users and allowing access to the software on the server to some of the plurality of remote users such that the number of remote users allowed access does not exceed the set number of available licenses. The remainder of the plurality of remote users can be placed in a queue. The method can further include sending alerts to remote users as licenses become available, and allowing access to the software on the server to the queued remote users.

9 Claims, 5 Drawing Sheets

U.S. PATENT DOCUMENTS

| | | |
|---|---|---|
| 6,029,195 A | 2/2000 | Herz |
| 6,044,145 A | 3/2000 | Kelly et al. |
| 6,044,368 A | 3/2000 | Powers |
| 6,055,567 A | 4/2000 | Ganesan et al. |
| 6,067,357 A | 5/2000 | Kishinsky et al. |
| 6,108,711 A | 8/2000 | Beck et al. |
| 6,112,186 A | 8/2000 | Bergh et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,179,206 B1 | 1/2001 | Matsumori |
| 6,185,292 B1 | 2/2001 | Miloslavsky |
| 6,199,099 B1 | 3/2001 | Gershman et al. |
| 6,202,062 B1 | 3/2001 | Cameron et al. |
| 6,226,618 B1 | 5/2001 | Downs et al. |
| 6,292,833 B1 * | 9/2001 | Liao et al. .................... 709/229 |
| 6,292,836 B1 * | 9/2001 | Teraoka ...................... 709/236 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,401,085 B1 | 6/2002 | Gershman et al. |
| 6,424,979 B1 | 7/2002 | Livingston et al. |
| 6,449,646 B1 | 9/2002 | Sikora et al. |
| 6,501,832 B1 | 12/2002 | Saylor et al. |
| 6,694,482 B1 | 2/2004 | Arellano et al. |
| 6,732,156 B2 | 5/2004 | Miloslavsky |
| 6,757,691 B1 * | 6/2004 | Welsh et al. ............. 707/104.1 |
| 6,889,222 B1 | 5/2005 | Zhao |
| 2001/0011254 A1 * | 8/2001 | Clark ......................... 705/59 |
| 2002/0035568 A1 | 3/2002 | Benthin et al. |
| 2003/0018677 A1 | 1/2003 | Mathur et al. |
| 2005/0135596 A1 | 6/2005 | Zhao |

* cited by examiner

METHOD OF QUEUING REQUESTS TO ACCESS A COMMUNICATIONS NETWORK

CROSS-REFERENCE TO RELATED APPLICATIONS

The present patent application is a divisional application of U.S. patent application Ser. No. 09/325,508 filed Jun. 3, 1999 now abandoned, which also claims the benefit of U.S. Provisional Application No. 60/121,214 filed Feb. 22, 1999.

FIELD OF THE INVENTION

The present invention relates to communications systems. In particular, the present invention relates to a method for queuing requests to access a communications network.

BACKGROUND OF THE INVENTION

Various types of communications systems exist which allow two systems or two individuals to communicate with one another over the communications system. Examples of such communications systems include automatic call distributors (ACDs), web servers, local area networks (LANs), public switched telephone networks (PSTNs), or combinations of these.

One problem with these communications systems is that the systems are typically capable of establishing a limited number of connections. As a result, when a user attempts to access the communications system, the user often is unable to establish a connection when the system has already reached its limit of available connections. The user may get an error message stating that a connection could not be established, or may not get any message at all. Since the user has no way of knowing when a connection can be established, the user must repeatedly attempt to access the server until a connection is made. During each attempt, the user has an equal chance of establishing a connection as another user that is making a first attempt.

In the case of a file server, for example over a LAN, when a PC user attempts to establish a connection with the file server, a connection will be made only if the limited number of active connections is not exhausted. When all the available connections are granted, any new connection attempt will be denied until a current user releases their connection. When the system is in this state, a user attempting to gain access to the file server has to manually retry establishing a connection while taking the risk that another user will gain access ahead of them. As result, assuming each user makes the same number of attempts, the selection of the user is entirely random. Similarly, in the case of a licensed program having a limited number of simultaneous users installed on a server, only a limited number of users can gain access to the licensed program at any one time. Once the number of users gaining access to the program reaches the maximum allowed, no other users are allowed access. Again, the user attempting to gain access to the server has to manually retry establishing a connection. In the case of a web server, when a user attempts to access a certain web page, the user will either be allowed access to the web page, or will receive an error message from the users web browser. If access is denied, to user has no way of knowing when and if access will be allowed.

Queuing is widely used on products such as ACDs where it is necessary to prioritize and manage callers and the availability of agents. Since there are usually more callers than agents, callers must wait, or queue for an agent. While the caller is in the queue, the caller is continuously connected to the ACD while waiting for an available agent.

SUMMARY OF THE INVENTION

A method of the present invention is provided for queuing requests for services through a communication network having a limited amount of resources for processing such requests. The method includes the step of receiving a request from a remote user for services through the communication network. A connection between the remote user and the communication network is established if sufficient resources are available to process the request. A signal is sent to the remote user if sufficient resources are not available to process the request. The remote user is queued for service once sufficient resources are available to process the request.

Another embodiment of the invention includes the step of receiving requests from a plurality of remote devices for access to the communications network. Connections between the communications network and a first group of the remote devices are established. A signal is sent to the remaining remote devices for which a connection is not established to indicate that a connection was not established. At least some of the remaining remote devices are queued for service at a later time.

A method of queuing requests to access to a server having software with a set number of available licenses includes the steps of receiving requests for access to software on the server from a plurality of remote users, allowing access to the software on the server to some of the plurality of remote users such that the number of remote users allowed access does not exceed the set number of available licenses, placing the remainder of the plurality of remote users in a queue, queuing remote users as licenses become available, and allowing access to the software on the server to the queued remote users.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present disclosure relates to communication systems capable of transmitting information between two systems. Particular embodiments are described below as used in a various communications environments. However, the teachings may be used in many other communication environments and with many other types of communication systems. The embodiments described below communicate information (such as web page information, voice information, data, etc.) across a communication system. Exemplary communications systems include, for example, web servers, LANs, PSTNs, ACDs, and transactions processing systems.

In a typical web server, data in the form of Hypertext Markup Language (HTML) pages is stored and made available to remote users. A remote user may request access to certain HTML pages stored on the web server. If the web server has the capability of making a connection to the remote user, the HTML pages can be viewed by a web browser on the system of the remote user. The remote user may be an individual or may an automated system.

In a typical LAN, which may be any type of network, the LAN is capable of communicating information between various nodes in the network. A LAN server may have a licensed program installed on the LAN to provide access to the licensed program to a number of users on the network. Typically, the licensed program will have a set number of available communications links, set artificially pursuant to a license agreement. For the purposes of this description, terms such as "available resources", "available connections", etc., shall include limitations from both physical limitations (such as limitations resulting from hardware capabilities) and artificial limitations (such as limitations resulting from contractual agreements, e.g., license agreements).

In a PSTN, information in the form of voice or data can be communicated between two or more users. Similarly, in an ACDs, or transaction processing systems, exemplary transactions include telephone calls, facsimile transmissions, electronic mail (e-mail), video sessions, or network sessions (such as an Internet session). A particular transaction can be either inbound (e.g., received by a transaction processing system) or outbound (e.g., transmitted from a transaction processing system). A transaction processing system is any device capable of receiving, transmitting, queuing, routing, or otherwise processing a transaction. A transaction processing system may also handle mixed transactions (e.g., receive a telephone call and respond to the telephone call using e-mail). Example transaction processing systems include automatic call distributors (ACDs), call centers, and other telephone call processing devices.

The teachings of the present invention may be used with any type of communication processing systems, including, but not limited to the communications systems described below.

Figure 1:
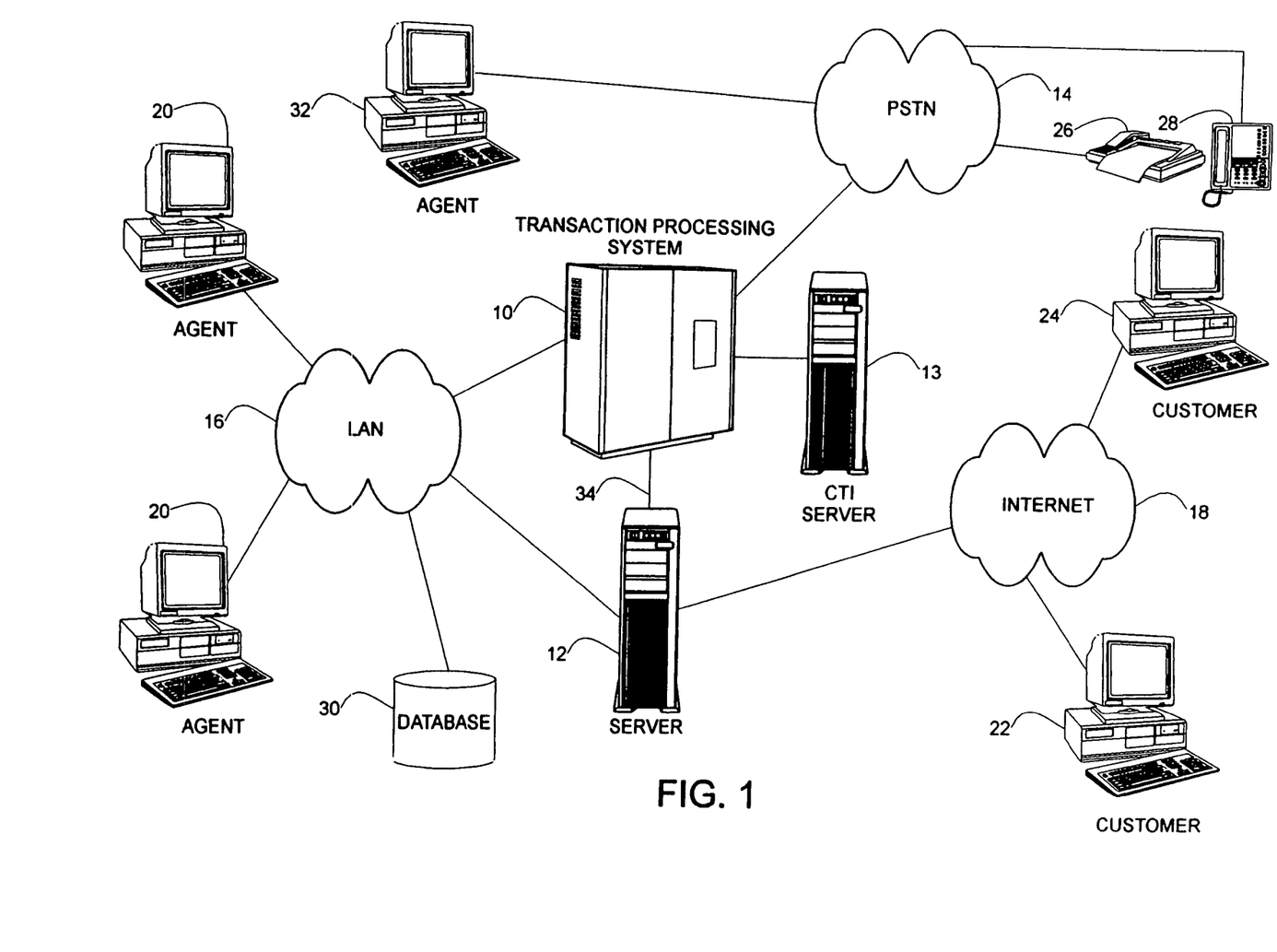
FIG. 1 illustrates an embodiment of a transaction processing environment in which the present invention may be used.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a received transaction (e.g., received from a customer) or initiate a new transaction.

FIG. 1 shows a transaction processing system 10 coupled to a server 12, a computer telephony integration (CTI) server 13, a public switched telephone network (PSTN) 14 and a local area network (LAN) 16. The transaction processing system 10 is capable of processing various types of transactions, such as telephone calls, electronic mail (e-mail), voice mail, and facsimiles. The transaction processing system 10 is capable of receiving transactions from PSTN 14, LAN 16, sever 12 and CTI server 13. Similarly, the transaction processing system 10 is capable of transmitting transactions to PSTN 14, LAN 16, server 12, and CTI server 13. For example, transaction processing system 10 can receive an incoming telephone call directly via PSTN 14. Another incoming telephone call may be received by server 12 (e.g., an Internet telephone call received across Internet 18) and provided to transaction processing system 10 across a communication link 34 or across the LAN 16. In other situations, the transaction processing system 10 may receive an incoming e-mail from server 12 or LAN 16.

The main server 12 is capable of interacting with various components in the transaction processing environment. For example, server 12 may operate as a web server, an e-mail server, a fax server, and a video server. Additionally, server 12 can perform the functions of a control server. FIG. 1 also illustrates a CTI server 13 which can provide capabilities such as intelligent call routing, third-party call control, coordinated call transfers, and screen synchronization, for example. In alternate embodiments of the invention, the transaction processing environment may include additional servers, in which each server is responsible for one or more types of transactions. For example, a web server may process all web-based transactions, an e-mail/fax server may process all e-mail and facsimile transactions, and a control server may control and manage various transactions and communication sessions in the transaction processing environment.

LAN 16 can be any type of network, including an intranet network, capable of communicating information between various nodes in the network. Further, LAN 16 may use any network topology and communicate data using any communication protocol. As shown in FIG. 1, multiple agents 20 are coupled to LAN 16. In a typical transaction processing environment hundreds or thousands of agents may be coupled to one or more LANs 16, which are in turn coupled to the transaction processing system 10. Alternatively, some or all of the agents 20 may be coupled directly to transaction processing system 10, rather than coupled through LAN 16. Although agents 20 are represented in FIG. 1 by a computer, a particular agent 20 may utilize any type of device or system that allows interaction between the agent and another person or device (such as a customer or a customer's computer). For example, an agent handling only telephone call transactions may only use a telephone system, without requiring a computer. Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

An agent 32 is not coupled to LAN 16, but instead is coupled to PSTN 14. Agents 20, discussed above, are located locally to transaction processing system 10 or include an access mechanism allowing agents 20 to establish a connection to LAN 16. Agent 32 is a remote agent or otherwise unable to directly connect to LAN 16. For example, agent 32 may be working at a location geographically distant from transaction processing system 10, such as working at home or while traveling. Agent 32 establishes a connection with transaction processing system 10 across PSTN 14. Alternatively, agent 32 may connect with LAN 16 or transaction processing system 10 through Internet 18 or any other network or communication system.

A database 30 is coupled to LAN 16 and is used by transaction processing system 10, agents 20 and 32, and server 12 to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database.

As shown in FIG. 1, Internet 18 is coupled to server 12 and customer computer 22 and 24. Customer computer 22 may include an Internet phone for establishing verbal communications between the customer and an agent across Internet 18. The customer using computer 24 has a telephone 28 and a fax machine 26 coupled to PSTN 14 and located near computer 24. Thus, the user of computer 24 may communicate with an agent of the transaction processing system using Internet 18 (e.g., using an Internet phone or e-mail application), fax machine 26, telephone 28, or any combination thereof. For example, customer 24 may generate and transmit an e-mail message across Internet 18 to server 12. Server 12 then communicates the e-mail to transaction processing system 10, which provides the e-mail to a particular agent or group of agents for response. Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system and the transaction initiator. In particular embodiments of the invention, the transaction initiator may specify the type of transaction used by the responding agent. For example, a transaction initiator may generate an email transaction, but request that an agent respond with a telephone call. Although customer computers 22 and 24 are shown coupled directly to Internet 18, it will be appreciated that any communication mechanism can be used to couple computers 22 and 24 to Internet 18, such as PSTN 14 and an Internet Service Provider (ISP). In alternate embodiments, Internet 18 may be replaced with any communication network using any communication protocol.

The environment illustrated in FIG. 1 includes a separate LAN 16 and Internet 18. In alternate environments, LAN 16 and Internet 18 are merged into a single communication network capable of communicating information between any two or more devices coupled to the communication network.

Figure 2:
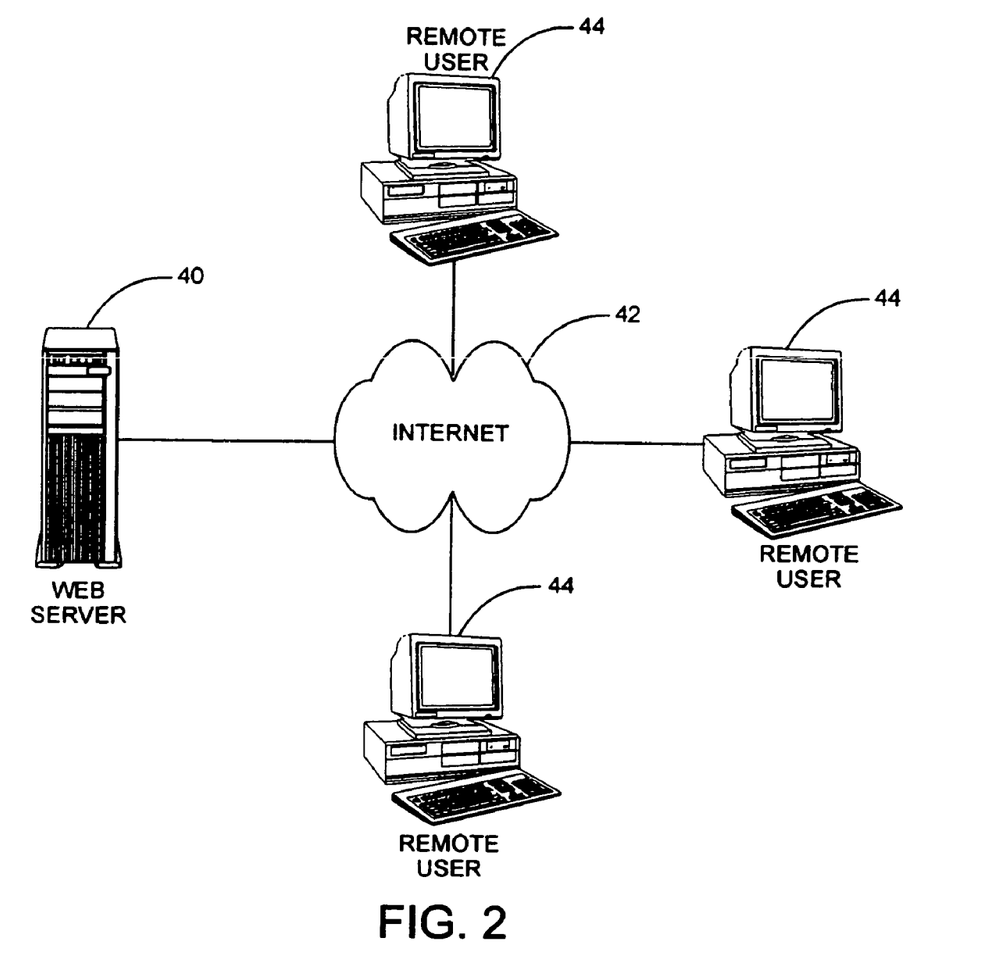
FIG. 2 illustrates an embodiment of an Internet environment in which the present invention may be used.

FIG. 2 illustrates an embodiment of an Internet environment in which the present invention may be used. FIG. 2 shows a web server 40 connected to Internet 42. Of course, Internet 42 could also be an intranet. A plurality of remote users 44 are shown connected to Internet 42. The remote users 44 are shown illustratively as computers, although the remote users 44 could be comprised of other devices. A remote user could also be thought of as the person using the computer. As mentioned above, a remote user 44 may request access to a certain HTML page stored on the web server 40. In response to the request, the web server 40 may allow the remote user 44 access to the HTML page requested.

Figure 3:
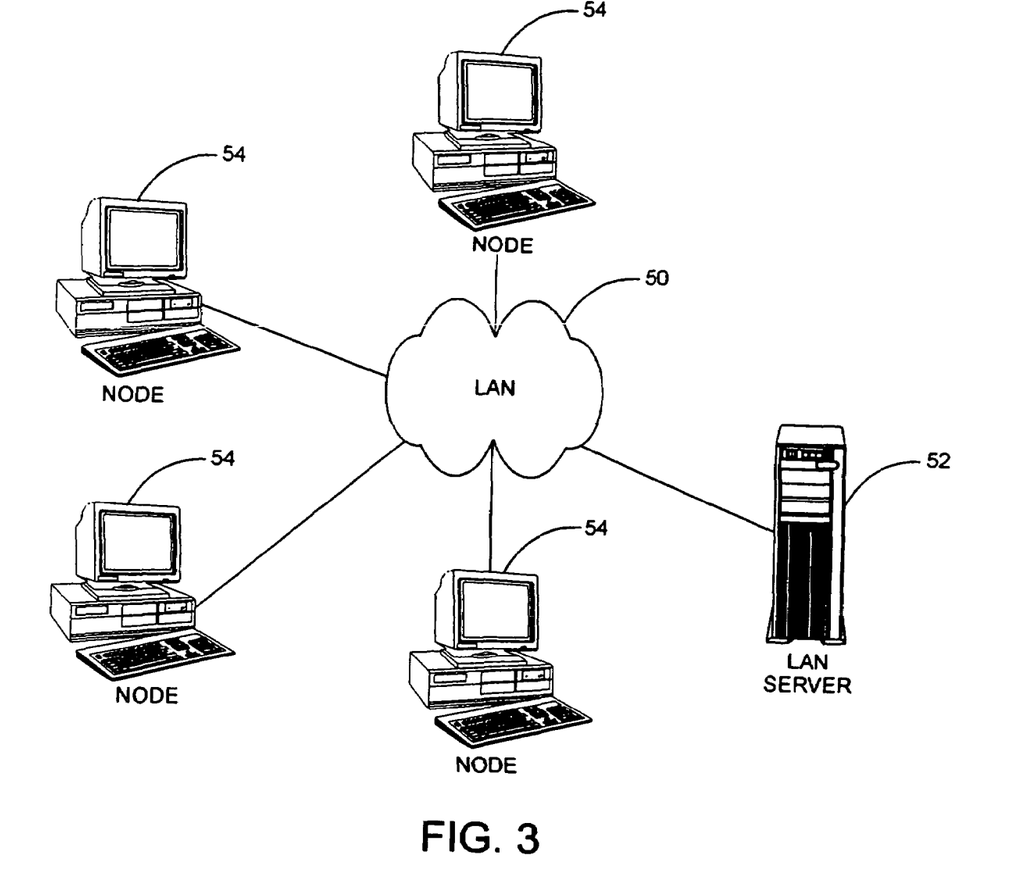
FIG. 3 illustrates an embodiment of a LAN environment in which the present invention may be used.

FIG. 3 illustrates an embodiment of a network in which the present invention may be used. FIG. 2 shows a LAN 50 connected to a LAN server 52. The LAN 50 includes a plurality of nodes 54 which are shown as computers. Nodes 54 could also be comprised of other devices such as printers, data storage devices, modems, Internet routers, etc. As mentioned above, the LAN 50 is capable of communicating information between the various nodes 54 and servers 52 and 56. The LAN server 52 includes LAN software such as Novel or Windows NT, for example.

The present invention will now be described as it applies to the environments described above. As stated before, the present invention could be applied to other environments as well.

The invention will now be described as it applies to the transaction processing system (which could be an ACD) shown in FIG. 1. In the transaction processing system shown in FIG. 1, a remote user such as customer 22 or 24 can request services in a number of ways.

First, a remote user such as customer 22 could request information via Internet 18. In this case, an Internet browser resident on the customer's computer would send a request to the server 12 over Internet 18. If sufficient resources are available, the server 12 will establish a connection between the server 12 and the customer 22. Typically, a limited number of connections are possible between the server and a remote user for the Internet. The number of connections is determined by various factors, including the hardware capabilities of the server such as the server 12. If a connection is not possible with the remote user at the time the user requests a connection, the present invention sends a message to the remote user indicating that a connection is not available. The message also preferably indicates that the user will be contacted once a connection is possible. At that point, the remote user is placed in a queue and will be contacted once a connection is available. Once a connection is possible, for example, after one more other remote users complete their transactions, the server 12 will send a message to the remote user indicating that a connection is possible. If the remote user responds during a specified time period, for example 10 to 15 seconds, the server 12 will establish a connection with the remote user.

The steps described above can be accomplished in a number of ways. In a first embodiment, the server 12 reserves one or more ports for receiving requests from remote users and either establishing connections to the available ports, or sending messages to the remote system indicating that a connection is not available. In the case where a connection is not possible, the server 12 can determine the IP address of the remote user before terminating the connection with the remote user. Once a connection is possible, the server 12 can contact the remote user by using the IP address of the remote user. Various means of contacting the remote user can be used within the scope of the present invention. Examples include instant messaging (which is becoming common on the Internet), email (although a longer response time period must be given to the remote user), or any other suitable means. Using steps outlined above, remote users waiting for a connection to become available, can be queued in the order in which they requested a connection. In this way, the remote users are prioritized, not merely allowed to connect at random as is the case with the prior art.

Second, a remote user may place a request for services via a telephone or fax machine (such as telephone 28 or fax machine 26) through a PSTN (such as PSTN 14). The case of telephone 28, one example of the implementation of the present invention is when a remote user attempts to call an agent such as agents 20. When the remote user places the call, the transaction processing system 10 will route the call to an agent 20, if an agent is available. If an agent is not available, the transaction processing system 10 can send a message (such as an audio message) back to the remote user, that no agents are available, but that the user will be contacted once an agent is available. The transaction processing system 10 will terminate the connection to the telephone 28 and place the remote user in a queue similar to be queue described above. Once a connection is available, the transaction processing system 10 can place a call to the remote user, indicating that a connection is now possible. Alternately, the transaction processing system 10 can contact the user in other ways, such as through the computer of the remote user.

Following is a description of how the invention could be applied to the web server 40 shown in FIG. 2. The implementation of the present invention for the web server 40 is very similar to the implementation described above with respect to the server 12, Internet 18, and customer 22. Each of the remote users 44 will typically have an Internet browser resident on their computer. When the remote user attempts to access an HTML page stored on the web server 40, the Internet browser will send a request, the over Internet 42, to the web server 40. If a connection is possible at that time, the web server 40 will establish a connection between the web server 40 and the remote user 44. If a connection is not possible, for example when the maximum number of connections are already established, the web server 40 will send a message to the remote user 44 indicating that a connection is not possible at that time. Preferably, the message will also tell the remote user that they will be contacted once a connection is possible. At that time, the remote user 44 is placed in a queue. Once a connection is possible, for example after another remote user terminates a connection, the web server 40 will send a signal to the remote user 44 indicating that a connection is now possible. At this time, the remote user 44 will be allowed to establish a connection to the web server 40. As connections become available to the web server 40, the remote users in queue will be contacted in the order that they requested a connection. Alternatively, certain remote users could establish priority over other remote users based on the importance of the connection. For example, certain employees of a company may require priority over other employees, or over non-employees. These employees requiring priority, can be queued first when connections are available.

As mentioned above, these steps can be accomplished in a number of ways. In a first embodiment, the web server 40 can store information about the remote user 44, such as the user's IP address. Once a connection is available, the web server 40 can use the stored information to contact the remote user 44. As mentioned above, the remote user 44 can be contacted in a number of ways. Also, in the preferred embodiment, one or more ports or connections are reserved exclusively for receiving requests from remote users. Upon receiving a request, a connection is established on another port, or the connection with the remote user is terminated after the message has been sent and the remote user 44 placed in the queue. In this way, the web server 40 will almost always have an available connection so that a remote user 44 will either get connected to the web server 40, or get placed in the queue.

Following is a description of how the invention could be applied to the LAN 50 shown in FIG. 3. As described above, the LAN 50 includes a LAN server 52 and various nodes 54. One example of the application of the present invention as applied to the LAN 50 show n in FIG. 3 involves the use or licensed software installed on the LAN server 52. In some cases, licensed software is purchased for a set number of simultaneous users. Therefore, no more than the set number of users may simultaneously use the software. When a user attempts to access the server 52 to use the licensed software, a connection will be made between the node 54 and the server 52 via the LAN 50 if a connection is available. If the maximum number of simultaneous users has already been reached, then the user will not be allowed access to the software on the server 52. In that case, a message will be sent to the user indicating that a connection is not possible. Preferably, the message will also indicate that once a connection is possible, the user will be notified. Once a connection is possible, for example when another user terminates a connection with the server 52, the user that requested a connection will be notified that a connection is available. If the user responds, a connection will be established.

Figure 4:
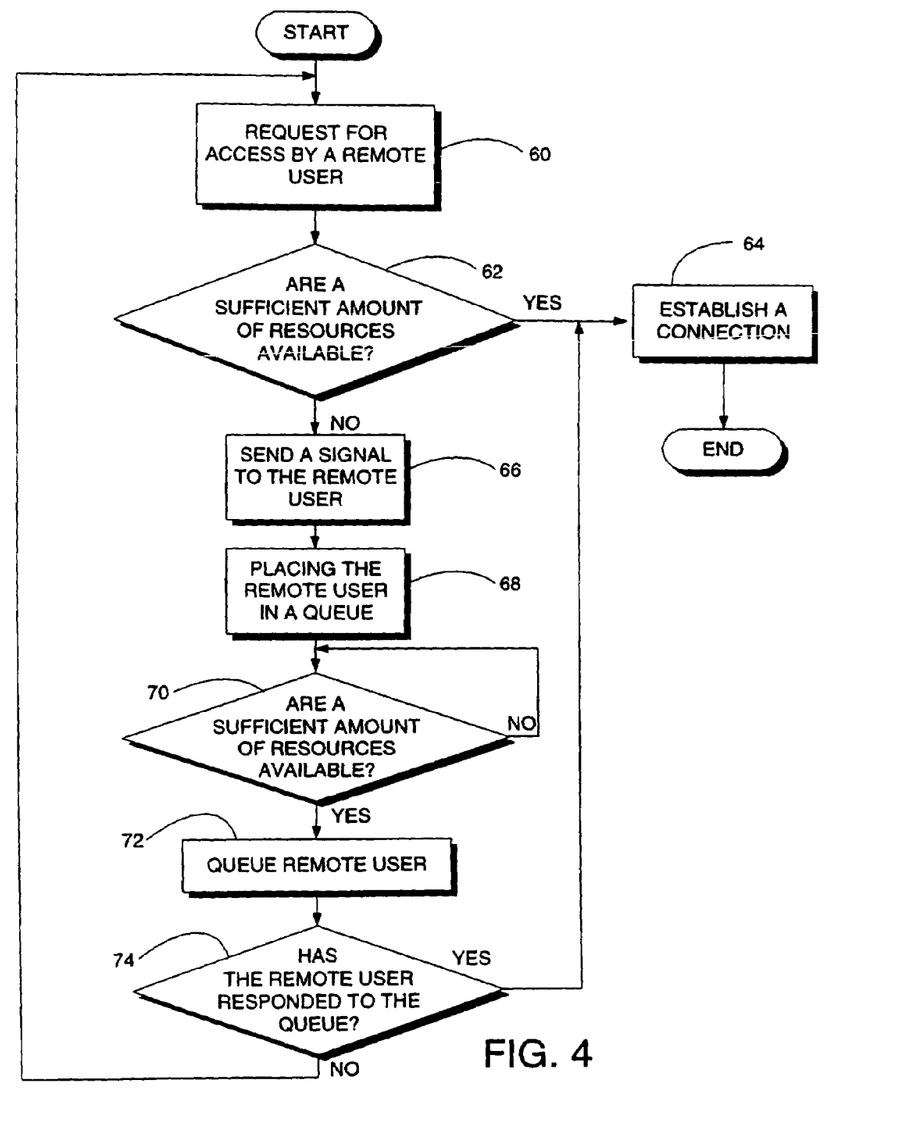
FIG. 4 is a flow diagram illustrating one embodiment for practicing present invention.

FIG. 4 is a flow diagram illustrating one embodiment of a procedure for practicing the present invention using any of the environments shown in FIGS. 1-3. At step 60, the remote user makes a request for access. At step 62, the procedure determines whether a sufficient amount of resources are available to provide access to the remote user. If a sufficient amount of resources are available, the procedure branches to step 64, where a connection is established between the remote user and the system. The procedure ends after step 64. If a sufficient amount of resources are not available, then the procedure branches to step 66, where a signal is sent to the remote user. Additionally, step 68 places the remote user in a queue. At step 70, the procedure determines whether a sufficient amount of resources are available to provide access to the remote user. If a sufficient amount of resources are not available, the procedure repeats step 70. If a sufficient amount resources are available, the procedure branches to step 72, where the remote user is queued by the system. At step 74, the procedure determines whether the remote user has responded to the queue. If the remote user responds to the queue, the procedure branches to step 64, where a connection is established between the remote user and the system. If the remote user does not respond to the queue, the procedure branches to step 60, where the procedure began.

In an alternative embodiment, if the remote user does not respond to the queue, the procedure could branch back to step 70 to give the user a chance to respond when additional resources become available. In another alternative embodiment, a counter could be implemented to provide a loop through steps 74, 70, and 72 to give a user a predetermined number of chances to respond to subsequent queues before the procedure branches back to step 60. As mentioned before, any number of procedures could be used to implement the present invention.

Figure 5:
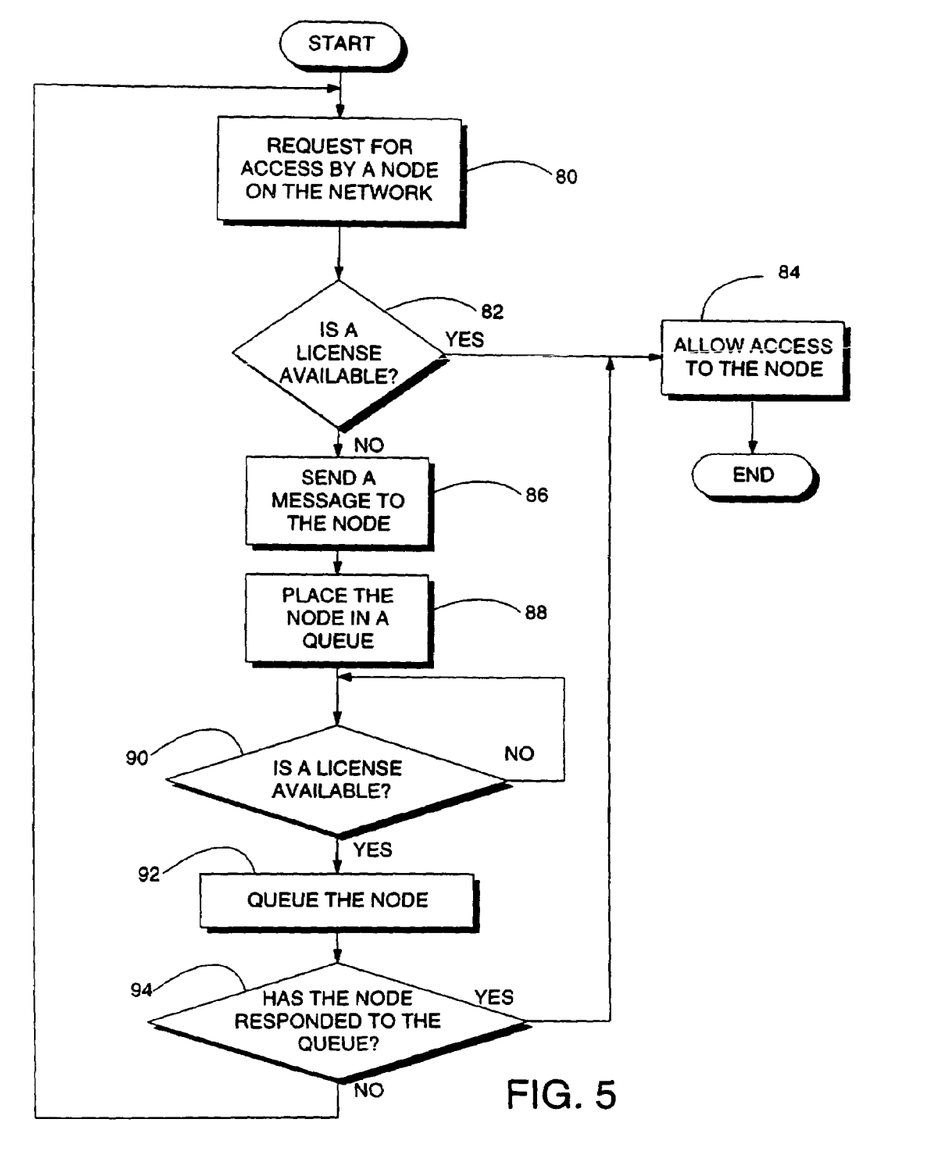
FIG. 5 is a flow diagram illustrating one embodiment for practicing the present invention in a LAN environment.

FIG. 5 is a flow diagram illustrating one embodiment of the procedure for practicing the present invention using the LAN environment with licensed software shown in FIG. 3. The procedure illustrated in FIG. 5 is similar to the procedure illustrated in FIG. 4. At step 80, the node makes a request for access. At step 82, the procedure determines whether a license is available. If a license is available, the procedure branches to step 84, where the node is allowed access. The procedure ends after step 84. If a license is not available, then the procedure branches to step 86, where a message is sent to the node requesting access. Additionally, step 88 places the node in a queue. At step 90, the procedure determines whether a license is available to the user. If a license is not available, the procedure repeats step 90. If a license is available, the procedure branches to step 92, where the node is queued by the system. At step 94, the procedure determines whether the node has responded to the queue. If the node has responded to the queue, the procedure branches to step 84, where the node is allowed access. If the node is not respond to the queue, the procedure branches to step 80, where the procedure began.

In an alternative embodiment, if the node does not respond to the queue, the procedure could branch back to step 90 to give the node a chance to respond when an additional license becomes available. In another alternative embodiment, a counter could be implemented to provide a loop through steps 94, 90, and 92 to give the node a predetermined number of chances to respond to subsequent queues before the procedure branches back to step 80.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of queuing request to access to a server having software with a set number of available licenses, the method comprising: receiving requests for access to the software on the server from a plurality of simultaneous remote users;
   allowing access to the software on the server to some of the plurality of simultaneous remote users such that the number of remote users allowed access does not exceed the set number of available licenses;
   sending a message to any remote user denied access, the message indicating that an access is not possible and that the user denied access will be notified when access is available placing remote users denied access in a queue;
   sending an alert to a queued remote user in the queue when a license becomes available, the alert indicating that access is available; and
   determining whether the queued remote user has responded to the alert;
   allowing access to the software on the server to the queued remote users only after the queued remote user responds to the alert; placing the queued remote users denied access back in the queue if the queued remote user does not respond to the alert, to allow the queued remote users an additional opportunity to respond when an additional license becomes available; wherein each of the queued remote users is allowed only a predetermined number of additional opportunities to respond to the alert before terminating the request for access.

2. The method of claim 1, wherein the remote users in the queue are prioritized based on when the requests are received.

3. A server comprising:
   a receiver to receive requests for access to a software on the server from a plurality of simultaneous remote users, the software having a set number of available licenses;
   a processor to allow access to the software on the server to some of the plurality of simultaneous remote users such that the number of remote users allowed access does not exceed the set number of available licenses, to generate and send a message to any remote users denied access, the message indicating that an access is not possible and that the user denied access will be notified when access is available, and to place remote users denied access in a queue;
   a transmitter to send an alert to a queued remote user in the queue when a license becomes available, the alert indicating that access is available;
   wherein the processor determines whether the queued remote user has responded to the alert, and allows access to the software to the queued remote users only after the queued remote users respond to the alert; wherein the processor places the remote users denied access back in the queue if the queued remote user does not respond to the alert to allow the queued remote user an additional opportunity to respond when an additional license becomes available; and comprising a counter to count a predetermined number of returns to the queue wherein each of the queued remote users is allowed only the predetermined number of additional opportunities to respond to the alert before terminating the request for access.

4. The server of claim 3, wherein the remote users in the queue are prioritized based on when the requests are received.

5. The server of claim 3 wherein one or more ports are reserved exclusively for receiving requests from remote users.

6. The server of claim 3 wherein the queued remote user must respond within a predetermined time period.

7. The server of claim 3 wherein information about the remote users is stored by the server, the server terminates contact with the queued remote user, and uses the information to contact the remote users as licenses become available.

8. A computer-readable storage medium having stored thereon data representing instructions that, when executed by a processor of a server, cause the processor to perform operations comprising:
   receiving requests for access to software on the server from a plurality of simultaneous remote users, the software having a set number of available licenses;
   allowing access to the software on the server to some of the plurality of simultaneous remote users such that the number of remote users allowed access does not exceed the set number of available licenses;
   sending a message to any remote users denied access, the message indicating that an access is not possible and that the user denied access will be notified when access is available placing the remainder of the plurality of remote users in a queue;
   sending an alert to a queued remote user in the queue when a license becomes as licenses become available, the alert indicating that access is available; and determining whether the queued remote user has responded to the alert; allowing access to the software on the server to the queued remote users only after the queued remote users respond to the alert;
   wherein the instructions further cause the processor to place the remote users denied access back in the queue if the queued remote user does not respond to the alert, to allow the queued remote user an additional opportunity to respond when an additional license becomes available; and wherein each of the queued remote users is allowed only a predetermined number of additional opportunities to respond to the alert before terminating the request for access.

9. The computer-readable medium of claim 8, wherein the remote users in the queue are prioritized based on when the requests are received.

* * * * *